Oct. 15, 1963 R. F. WELLS 3,106,977
LOCKING MEANS FOR THE BEAM OF A WEIGH SCALE
Filed Aug. 4, 1961
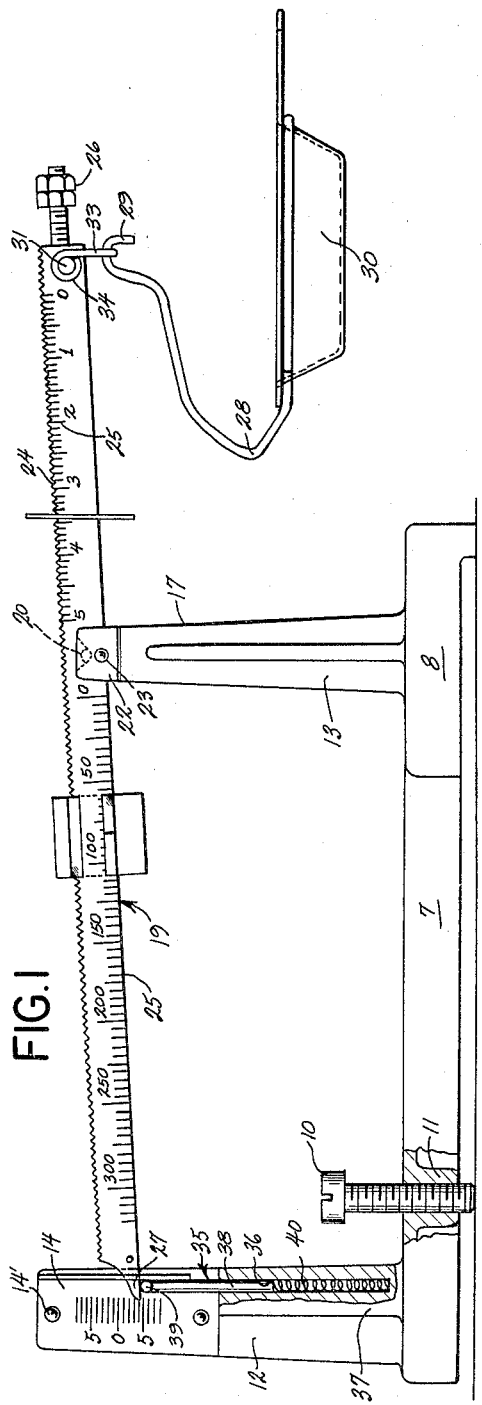
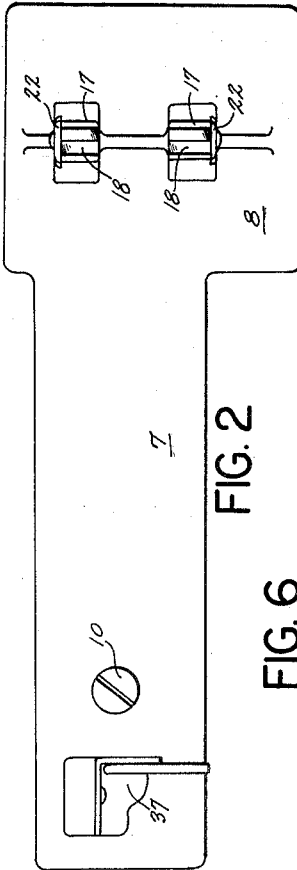
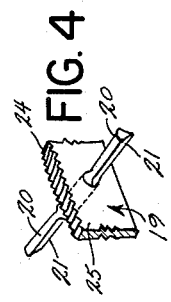
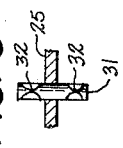
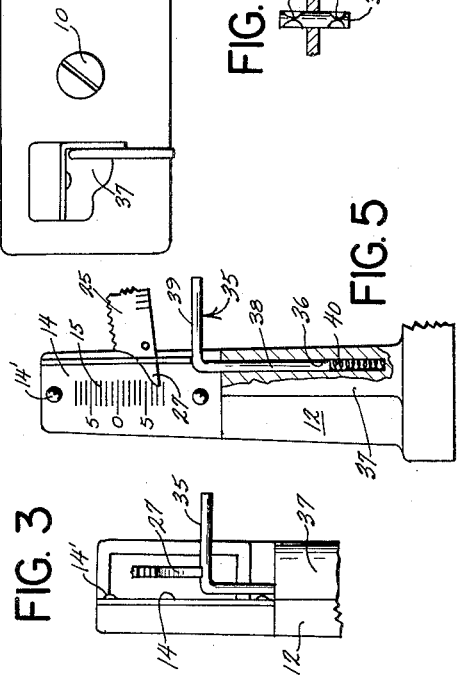
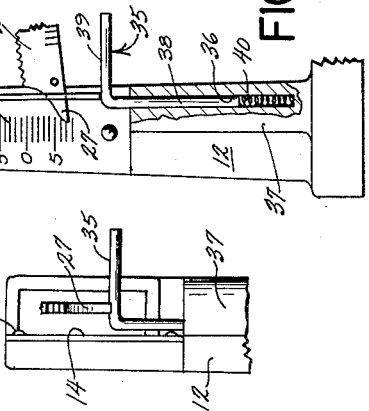
INVENTOR.
ROGER F. WELLS
BY David K. Kilgore
ATTORNEY

United States Patent Office 3,106,977
Patented Oct. 15, 1963

3,106,977
LOCKING MEANS FOR THE BEAM OF A WEIGH SCALE
Roger F. Wells, Howard Lake, Minn.
Filed Aug. 4, 1961, Ser. No. 129,328
1 Claim. (Cl. 177—184)

This invention relates broadly to weigh scales, more particularly to weigh scales embodying a rocking beam with sliding weights, said beam being mounted on a single fulcrum, and specifically to a weigh scale for measuring grain weight of gunpowder and bullets for use in the handloading of ammunition for firearms.

The principal object of this invention is to provide a precision weigh scale of the class described that is simple to operate and read, highly accurate and stable when set to a specific weight, and minutely adjustable to within one-tenth grain weight, and having a total capacity of 325 grains.

A further object of this invention is to provide a precision weigh scale of the class described having knife edge fulcrum bearings of heat treated tool steel that are hand honed and chrome plated for hardness.

A still further object of this invention is to provide a precision weigh scale of the class described having a novel beam lock mechanical dampener that retards the oscillation of the beam during a weighing operation.

These and other objects of the invention will become apparent from the following specification and claim when taken in conjunction with the accompanying drawings which form a part of this application and in which drawings, like characters indicate like parts throughout the several views.

To the above end, generally stated, the invention consists of the following devices and combination of devices hereinafter described and defined in the claim.

Referring to the drawings:

FIG. 1 is a side elevational view of the improved weigh scale.

FIG. 2 is a top plan view of the same with the beam removed.

FIG. 3 is a fragmentary end elevational view of the pointer end of the scale showing the beam lock in operative position.

FIG. 4 is a fragmentary view on an enlarged scale showing the fulcrum bearings.

FIG. 5 is a fragmentary view of the pointer end of the weigh scale on an enlarged scale with the beam lock shown in an inoperative position, and FIG. 6 is a fragmentary view showing the pan supporting bearing on the pan end of the beam.

For the purpose of clarity and brevity in this application, as the weigh scale is viewed in FIG. 1 the right hand end thereof will hereinafter be referred to as the pan end of the scale and the left hand end thereof as the pointer end.

The numeral 7 is directed to a cast, substantially rectangularly shaped base that is transversely widened, see numeral 8, at its pan end, and at that same end, is provided with a pair of short integral legs 9. The pointer end of the base 7 is supported by a leveling screw 10 that has screw threaded engagement with the base 7 and a depending boss 11 formed in the underside thereof.

Formed integral with the base 7 at substantially each end portion thereof are a pair of upstanding posts the one at the pointer end of the weigh scale being identified by the numeral 12 and the one at the pan end thereof by the numeral 13. The post 12 is constructed and dimensioned to receive a graduated pointer scale plate 14 that is suitably and rigidly secured by screws or rivets 14' to the upper end portion of the upstanding post 12. The graduations 15 on the pointer scale plate 14 read both below and above a zero mark which indicates the exact point of balance of the scale when the same is in use as will presently appear. The pointer scale plate 14 at its inner longitudinal edge portion is constructed and arranged to be bent forwardly at right angles to the face thereof and is provided with a longitudinally disposed vertical slot 16, the dual purpose of which will also presently appear.

The upstanding post 13 formed in the pan end of the base 7 is terminated at its upper end portion in the form of a pair of laterally spaced prongs 17 having machined V-notches 18 formed therein to afford a fulcrum for a rocking beam 19. This rocking beam 19 is provided with a V-shaped fulcrum bar 20 that extends transversely through the rocking beam 19, is rigidly secured thereto against endwise or axial movements, and is provided with a honed and hardened knife edge 21 that rests in the V-notches 18 of the upstanding post 13. A pair of end plates 22 are suitably secured to upper end portion and outer faces of the prongs 17 by means of screws or rivets 23 to close the V-notches 18 and hold the fulcrum bar 20 mounted in the rocking beam 19 against lateral endwise movements.

The horizontally disposed rocking beam 19 is provided with relatively deep sharp serrations 24 along its upper edge portion and a graduated scale 25 on the face of the beam 19 is in register with said serrations 24. It is important to note here that each graduation 25 appearing on the face of the beam 19 between the upstanding posts 12 and 13 is equal to five grains weight and that the graduations 25' on the pan end of the beam 19 outside the upstanding post 13 is equal to one-tenth grain weight. Sliding weight members 26 and 27 work in the respective series of series of serrations 24. A pair of balancing nuts 26 having locking engagement with one another have screw threaded engagement with the pan end of the beam 19 and the pointer end of the said beam is provided with a chisel point 27 that works in the out-turned slot 16 of the graduated pointer scale plate 14 to indicate 8 divisions of reading on the pointer scale plate 14 above and below zero for checking variations in powder charges or bullet weights.

A pan hanger 28 having a hook 29 in its upper end portion and a pan 30 is supported by a transversely disposed bearing 31 which extends through the rocking beam 19 at the extreme outer end of the pan end thereof and is rigidly secured against axial and endwise movements relative thereto. A knife edge 32 is formed in the upper edges of the bearing 31 for engagement with a relatively heavy wire, free swinging yoke 33 having loops 34 in each end portion thereof, each of which engage and rest upon a knife edge 32 of the bearing 31. This yoke is constructed and arranged to underlie the beam 19 and provide a means whereby the pan hanger 28 is supported on the beam 19 by engagement of the hook 29 with the yoke 33. It will be understood that the pan hanger 28 is constructed in such a manner so as to permit easy removal and replacement of the pan 30 thereon.

It is well known that in weigh scales of the type described herein that the prolonged oscillation of the beam is annoying and time consuming, said oscillations being caused mainly by the swinging of the pan hanger 28 and its mounted pan 30 on the yoke 33.

To eliminate this problem, I provide a beam locking means in the form of a spring loaded L-shaped member 35 that is mounted for movement in a vertically disposed bore 36 in a boss 37 formed in the upstanding post 12 on the pointer end of the base 7.

This bore 36 underlies the slot 16 in the scale pointer plate 14 and by the same token, similarly underlies the chisel point 27 of the beam 19. The depending leg 38 of the L-shaped beam locking member 35 has a relatively close frictional working fit with the bore 36; and the horizontal leg 39 thereof is held inoperable against the tension of a coiled spring 40 mounted in the bore 36 by turning the same in depressed position beneath the lower edge of the slotted portion 16 of the pointer scale plate 14, pointing toward the pan end portion of the base 7. To render the beam locking member operable, the horizontal leg 39 thereof is swung in a 180 degree arc about the axis of the depending leg 38 and out of engagement with the lower edge portion of the outstanding portion 16 of the scale plate 14 and then allowed to be projected upwardly until said horizontal leg 39 is positioned at a slightly below zero reading on the graduation marks 15 on the pointer scale 14. Thus the chisel point 27 of the beam 19 will come to rest on the horizontal member 39 as the natural tendency on such a weigh scale is for the pointer end of the beam to hang down. With the beam 19 in such a position and without the benefit of my novel beam locking means 35 it is difficut to add just enough powder to overcome this off-center weight balance of the beam 19. With the beam locking means in operable position and near balanced as explained above, the same is much more sensitive to the last few granules of powder being added and will give a fast zero reading with little chance of overcharging.

While there are herein disclosed but a limited number of embodiments of the structure, process and product of the invention herein presented, it is possible to produce still other embodiments without departing from the inventive concept herein disclosed, and it is desired therefor, that only such limitations be imposed on the appended claim and are stated herein or required by the prior art.

What I claim is:

A weigh scale of the class described comprising in combination, a base, a pair of transversely spaced upstanding posts at the right hand end portion of said base, said posts having a bearing formed in the upper end portions thereof, an oscillatory rocking beam having adjustable weight members slidably mounted thereon intermediately fulcrumed on said bearings, a single upstanding post mounted on the said base at the left hand end portion thereof affording a mounting station for means associated with the said beam to limit the oscillatory movements thereof, said means comprising a relatively long vertically disposed bore formed in the said single upstanding post, a substantially L shaped locking member the lower leg of which has frictional engagement with the said bore in the said single upstanding post, and the horizontal leg thereof having abutting engagement with the oscillatory rocking beam when said locking member is in operable position.

References Cited in the file of this patent

UNITED STATES PATENTS 2,775,444    Hadley               Dec. 25, 1956
3,027,955    McCown             Apr. 3, 1962